No. 799,647.  
PATENTED SEPT. 19, 1905.  
P. HART.  
ORE CRUSHER.  
APPLICATION FILED MAY 3, 1904.
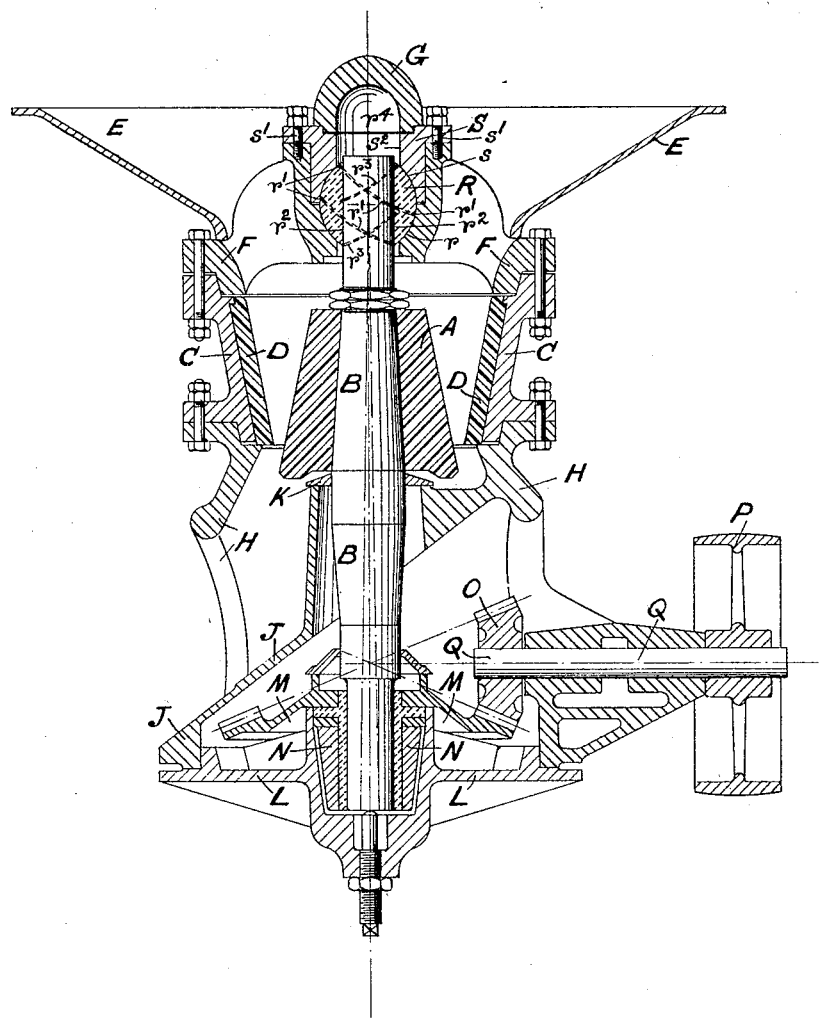
Witnesses:
Inventor:  
Peter Hart  
by Chas. Ovendale.  
Attorney

UNITED STATES PATENT OFFICE.

PETER HART, OF JOHANNESBURG, TRANSVAAL.

ORE-CRUSHER.

No. 799,647.     Specification of Letters Patent.     Patented Sept. 19, 1905.

Application filed May 3, 1904. Serial No. 206,157.

*To all whom it may concern:*

Be it known that I, PETER HART, a subject of the King of England, residing at Johannesburg, Transvaal, have invented certain new and useful Improvements in Ore-Crushers, of which the following is a specification.

This invention relates more particularly to that kind of rock, stone, or ore crusher known as a "gyratory" crusher, in which a crushing head or cone arranged on a vertically-disposed shaft or spindle has a gyratory and eccentric motion imparted to it. Although primarily designed for such machines, the improvements may be adapted to crushers of the reciprocating-jaw type.

In gyratory crushers the top bearing for the main or cone shaft is located in the spider or tripod above the center of the feed-hopper, and as most commonly constructed it consists of a parallel bush fitted in the boss or center of the spider. The bush has in some cases been made taper at the bottom, and in other instances an oscillating box has been provided in the boss of the spider for the upper end of the shaft. The gyratory and eccentric motion is imparted to the cone-shaft through the medium of an eccentirc or eccentrically-bored hub fitted round the lower end of the shaft beneath the cone, and the devices above described have been employed to compensate for the movement of the shaft in the top bearing resulting from the gyratory and eccentric motion. Now these arrangements do not work satisfactorily, and for want of a suitable construction of bearing it is a by no means uncommon occurrence for the shaft to be broken. Further, as a great deal of wear takes place in such top bearings the bushings and other parts have to be frequently renewed. Consequently the cost of repairs of such machines is very heavy.

The object of my invention is to provide a top bearing for such shafts which will obviate the defects and deficiencies of the existing constructions.

According to the present invention I provide a ball or sphere which fits loosely over the upper end of the shaft and is located in a spherical socket formed in or fitted to the spider. To provide for the lubrication of the bearing, spiral or other grooves may be cut in and around the ball and or socket, and inside the ball and or on end of the shaft.

The invention will now be described in detail by aid of the accompanying drawing, in which a gyratory crusher of well-known construction is illustrated with the invention applied thereto.

The drawing shows a sectional elevation of the machine.

The machine consists of the head A, secured on the shaft or spindle B inside the top shell or casing C, which latter is fitted with the concaves or liners D. E is the hopper, and F the spider or tripod. G is the dust cap or cover for the top of the spider F and top bearing. H is the bottom shell, and J the inclined plane which forms the discharge-outlet of the machine. K is the dust-ring, arranged beneath the cone A; L, the bottom plate in which the vertical shaft B is supported; M, the bevel-wheel, and N the eccentric for imparting the gyratory and eccentric movement to the shaft B. O is a bevel-pinion gearing with the bevel-wheel M for driving the latter, and P Q the pulley and shaft, respectively, for driving the bevel-pinion O. These several parts may be of the ordinary or any other suitable construction.

On the upper extremity of the shaft or spindle B is loosely arranged the ball or sphere R. The boss or center of the spider F is shaped on the inside, as seen at $r$, to fit the lower portion of the ball R, and in the top of the spider F is fitted a gland S, which is shaped on the inside, as seen at $s$, to fit round the upper portion of the ball R. The gland S and the interior of the boss of the spider F form a socket in which the sphere R is free to move in any direction. The gland S is secured in the top of the spider F by means of the studs or bolts $s'$, which provide for any desired or necessary adjustment of the socket. The gland S is formed with an opening $s^2$ at the center exceeding the diameter of the upper end of the shaft B to allow of any desired vertical adjustment of the shaft B.

Around the outside of the sphere or ball R a spiral groove or grooves $r'$ may be formed, and the cylindrical hole $r^2$ in the sphere R, into or through which the upper extremity of the shaft B projects, is also preferably formed with a spiral groove or grooves $r^3$, so that a lubricant may pass out of the chamber $r^4$, formed by the dust-cap G and the hole in the gland S, into the socket and into the sphere R around the end of the shaft B.

It will be understood that the sphere R is free to move in the socket in the spider F, and so compensate for the movement imparted to the upper end of the shaft B due to the eccentric and gyratory movement of the lower extremity thereof.

What I claim as my invention, and desire to protect by Letters Patent, is—

In a crusher of the nature indicated in combination, a cone-spindle and a crushing-cone secured thereon, means for imparting a gyratory and eccentric motion to said spindle, a ball slidably fitted on the upper extremity of the cone-spindle above the cone, a spider forming a bearing for the upper end of the cone-spindle, said spider having a semispherical internal recess which is adapted to receive a portion of the ball and an adjustable gland fitted in the top of the spider and having an internal semispherical recess to fit the upper portion of the ball, the gland being fitted to the spider in such a manner that a spherical socket is formed for the ball in which the ball is confined vertically and permits it to rotate, the gland also having a hole above the top of the cone-spindle, and a cap which serves for closing the hole in the gland, said cap having an internal recess forming with the hole in the gland, a grease or lubricant holding box communicating with the spherical socket and from which the grease or lubricant can pass between the sphere and socket and ball and spindle, substantially as described.

In witness whereof I have hereunto set my hand in the presence of two subscribing witnesses.

PETER HART.

Witnesses:
CHAS. OVENDALE,
R. OVENDALE.